Sept. 30, 1958   L. J. ERB   2,854,093
AIR CLEANER

Filed Sept. 14, 1956   3 Sheets-Sheet 1

INVENTOR.
Lawrence J. Erb
BY
Atty.

Sept. 30, 1958          L. J. ERB          2,854,093
AIR CLEANER
Filed Sept. 14, 1956          3 Sheets-Sheet 2
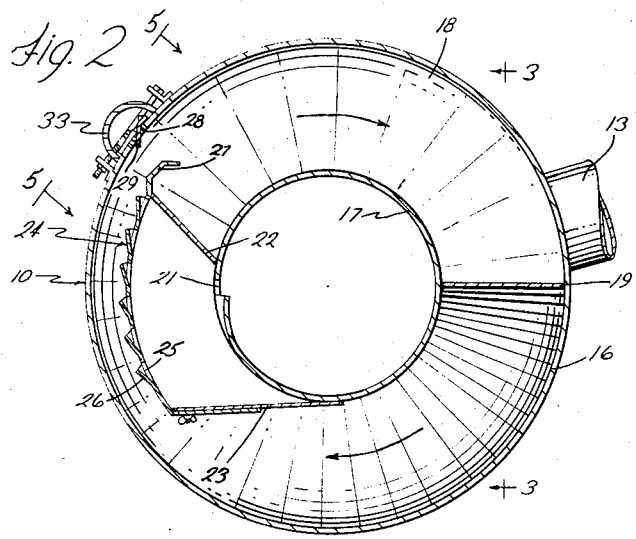
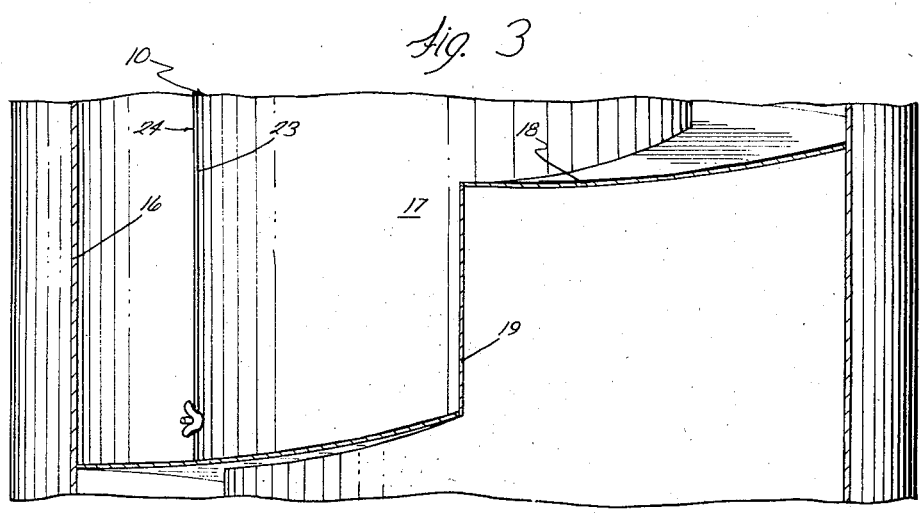
*INVENTOR.*
*Lawrence J. Erb*
BY
*Atty.*

Sept. 30, 1958 L. J. ERB 2,854,093
AIR CLEANER
Filed Sept. 14, 1956 3 Sheets-Sheet 3
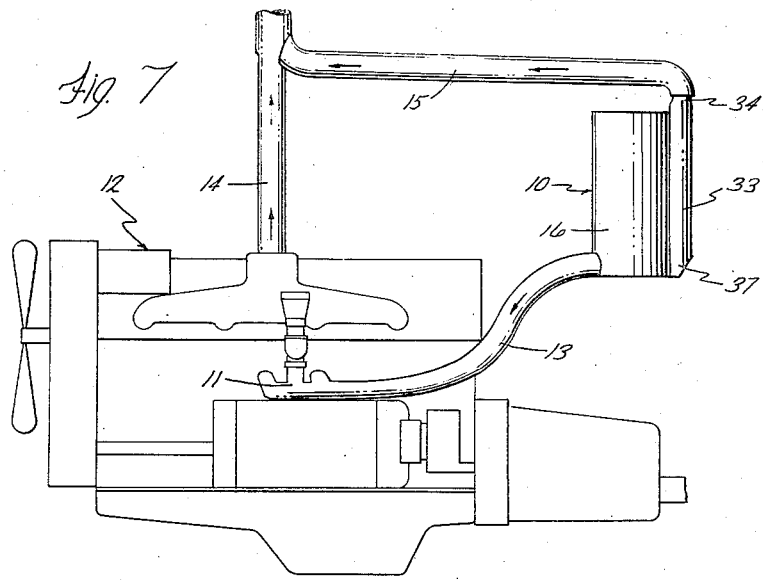
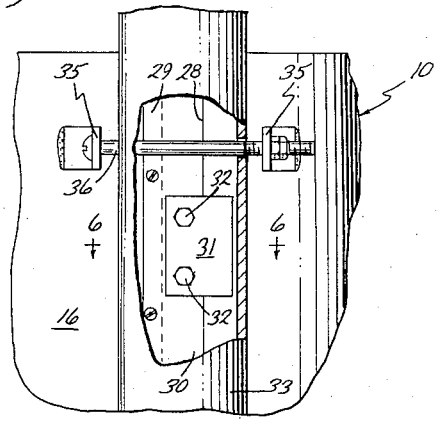
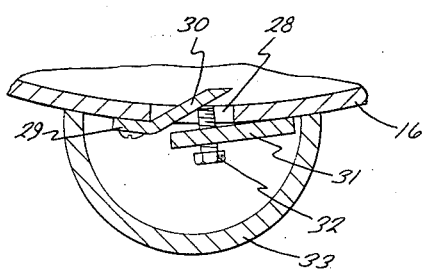
INVENTOR.
Lawrence J. Erb
BY
Atty.

United States Patent Office 2,854,093
Patented Sept. 30, 1958

2,854,093

AIR CLEANER

Lawrence J. Erb, Spokane, Wash., assignor of thirty-five percent to Spokane Diesel Electric Company, Spokane, Wash.

Application September 14, 1956, Serial No. 609,961

6 Claims. (Cl. 183—92)

My invention relates to improvements in an air cleaner. Although not limited to such use my invention is particularly useful in cleaning the air entering the intake manifold of internal combustion engines for mixture with the fuel that is to be burned in the combustion chamber of the engines. These engines are often operated under conditions where the air is heavily laden with particles of dust. Such particles are often highly abrasive and cause excessive wear of the engine parts. Many efforts have been made to provide a satisfactory device for removing the damaging particles before the air enters the intake manifold. However, such devices, of which I am aware, are of a filter type which traps the dust particles and retain them either in a finely divided mass of material or in a liquid bath or both.

It is a principal purpose of my invention to provide an air cleaner wherein the dirt, dust, etc. removed from the air is discharged so that it cannot accumulate in the cleaner and the cleaner is thus maintained at the same efficiency without the necessity of periodical cleaning or replacement of parts because they become clogged with the particles removed from the air.

It is further a purpose of my invention to provide an air cleaner of this type wherein the flow of air is restricted a minimum amount so that the volume of air reaching the intake manifold is more than ample and the effects of rarification of the air are avoided. The difficulties of obtaining enough air for proper combustion at high altitudes where the air pressure is low, are well known. When the air cleaner unduly restricts the inlet of air to the intake manifold the same difficulties naturally follow.

My invention is embodied in a cleaner wherein air can enter a shell freely and is circulated through the shell in such a fashion that the particles of dirt, dust, etc. are moved outwardly against the inner wall of the shell and drawn off, the remaining air being caused to travel in a helical path to the air outlet of the cleaner. This outlet is connected to the intake manifold of an internal combustion engine and the exhaust manifold of the engine is so connected to the shell that it serves to provide the necessary suction to draw off the heavier than air particles of dust, dirt, etc. and discharge them with the exhaust from the engine.

The nature and advantages of my invention will appear more fully from the following description and the accompanying drawings wherein a preferred form of the invention is shown. It is contemplated, however, that changes in the details of construction may be made within the scope of the claims.

In the drawings:

Figure 2 is a sectional view taken on the line 2—2 of Figure 1;

Figure 3 is an enlarged fragmentary sectional view taken on the line 3—3 of Figure 2;

Figure 5 is an enlarged fragmentary view with parts broken away looking at Figure 2 from the line 5—5;

Figure 6 is an enlarged sectional view taken on the line 6—6 of Figure 5; and

Figure 7 is a side view illustrating the air cleaner operatively connected to an internal combustion engine to clean the air entering the intake manifold.

Figure 1:
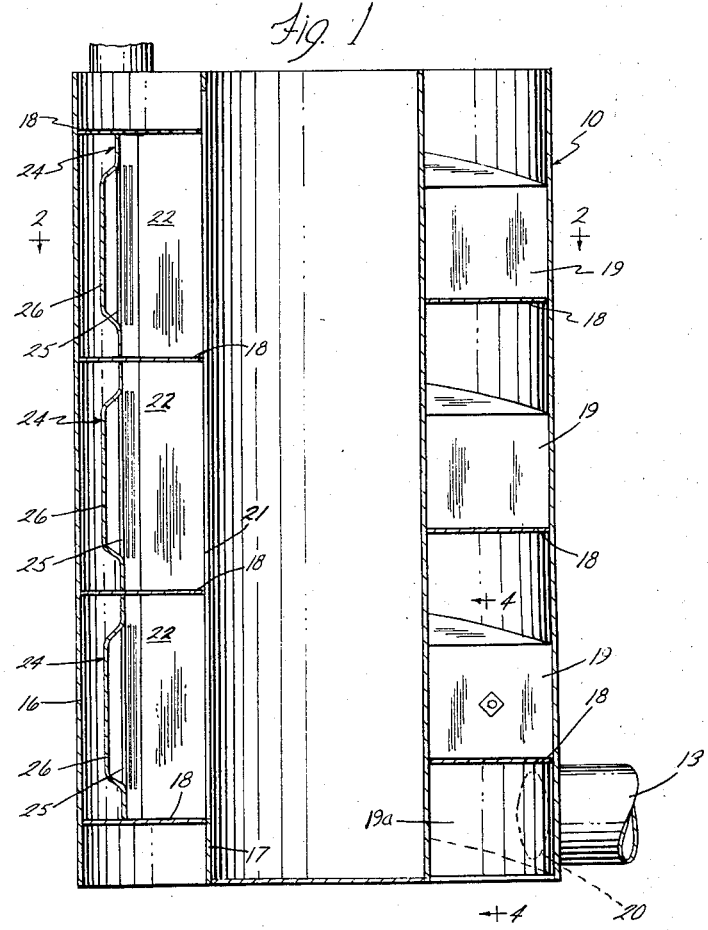
Figure 1 is a vertical sectional view through an air cleaner embodying my invention.

In order that the objects and advantages of my invention will be fully understood a detailed description of the construction and operation of an air cleaner embodying the invention follows:

As illustrated in Figure 7, the air cleaner 10 is connected to supply air to the intake manifold 11 of an internal combustion engine 12 by an air duct 13. The air cleaner 10 is also connected to the exhaust pipe 14 of the engine 12 by a conduit 15 in such a manner that exhaust gases flowing out through the exhaust pipe 14 create a partial vacuum in the conduit 15 so that the dirt laden air is drawn from the cleaner 10 through the conduit 15 and discharged with the exhaust gases. In other uses of the air cleaner any suitable means may be used instead of the exhaust pipe 14 to create the necessary partial vacuum in the conduit 15. The description hereinafter will point out the cooperation of the conduit 15 with the interior parts of the air cleaner 10.

Figure 4:
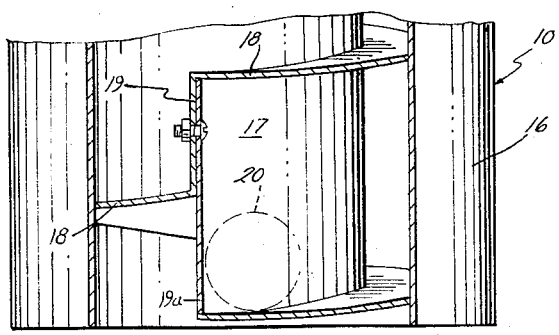
Figure 4 is a sectional view taken on the line 4—4 of Figure 1.

Referring now to Figures 1 to 6 inclusive, which show the details of construction of the cleaner 10, it will be noted that the cleaner 10 comprises an outer cylindrical shell 16 and an inner cylindrical tube 17. The tube 17 and the space between the shell 16 and the tube 17 are open to the atmosphere. A divider sheet 18 connects the shell 16 and the tube 17. This sheet extends helically around the tube 17 and has vertical offset portions 19 formed therein, one directly above the other. There is one vertical portion 19 for each complete turn of the divider sheet 18 about the tube 17. Air can flow downwardly between the tube 17 and the shell 16 by following the helical path outlined by the sheet 18 until it reaches the outlet 20 to the air duct 13. The number of convolutions of the sheet 18 about the tube 17 may be varied to suit the particular installation. A plate 19a closes the path at the outlet.

Directly opposite the offset portions 19, and following them in the direction of air flow, the tube 17 has a slot 21 therein. On opposite sides of the slot and extending outwardly from the tube 17 are partition members 22 and 23, both inclined in the direction of air flow with respect to a radius of the tube 17. These members 22 and 23 extend from one convolution of the sheet 18 to the next. A louvered cover 24 fits to the outer edges of the members 22 and 23 and has its openings 25 and deflectors 26 so arranged as to deflect air, dust, etc. engaging them outwardly toward the shell 16. The cover 24 is extended past the member 22 as indicated at 27 so as to maintain a restriction in the air passage beyond where air deflected outwardly by the deflectors 26 would strike the shell 16. The parts 22, 23 and 24 cooperate with the tube 17 to form a chamber which receives air through the slot 21 and discharges air through the openings 25.

In order to remove the heavier than air dust particles that are crowded out against the shell 16 as the air moves between the shell 16 and the cover 24, I provide a skimmer slot 28 in the wall of the shell 16. This slot is shown best in Figure 6. The shell 16 is slotted and a spring strip 29 is fastened to the shell exterior and extends through the slot 28 to the interior of the shell 16 where it forms a skimming lip 30 to direct air through the slot 28. In order to adjust the amount of extension of the lip 30 into the interior of the shell 16, I provide bars 31 which are fixed to the shell 16 with screws 32 to press against the lip 30.

The slot 28 and the strip 29 are covered by a semicircular hood 33. The hood 33 extends full length of the shell 16 and above the shell 16 is formed into a tubular portion 34 that fits into the conduit 15. (See Figure 7.) The hood 33 is separably secured in place over the slot 28 in any suitable manner such as by lugs 35 on the shell 16 and a bolt 36 that extends through the lugs and through the hood 33. The hood 33 is open to the atmosphere at the end opposite the tubular portion 34 but is restricted in cross section at this end as indicated at 37, so that heavy dirt particles skimmed off into the hood can fall out but the inlet of air from outside the shell into the hood 33 is restricted to develop air flow up through the space beneath the hood 33.

In operation of the air cleaner the air duct 13 draws air from the space between the tube 17 and the shell 16 and causes air flow in a helical path downward from the open top of the cleaner along the path of the sheet 18. At the same time the exhaust gases from the engine draw air through the conduit 15 due to the venturi action of the exhaust gases passing the outlet end of the conduit 15. This causes an air flow from the space between the hood 33 and the shell 16 into the conduit 15. As the air flowing between the shell 16 and tube 17 passes the louvered cover 24, the air between the cover 24 and the tube 17 flows out through the openings 25 joining the helical flow. The resulting action is to concentrate the dirt particles at the inner surface of the shell where they are skimmed off by the lip 30 as they pass the slot 28. In this way the air is substantially cleaned of damaging dirt by the time it reaches the outlet 20 to the air duct 13. The removed particles are disposed of too. They do not accumulate and gradually lessen the efficiency of the cleaner. It will be noted that the air passage through the cleaner is large enough in cross section at all points to provide ample air at the outlet 20 with very little rarification. This too is important in supplying air for combustion in the engine. The smallest cross section of the helical passage is substantially larger than the outlet opening 20.

While I have shown and described my air cleaner in connection with an internal combustion engine, it is obvious that it may be useful in many other situations. Other means than exhaust gases from the engine may be used to discharge the skimmed off fraction of air and dirt from the cleaner so it will not again be added to the air entering the cleaner. The characteristic of concentrating and skimming off the dirt particles by a combination of the helical flow of air with the outward directing of air through the cover 24 just in front of the skimmer has been found to be particularly effective in removing the damaging abrasive particles of dirt and dust so often encountered where self powered vehicles are used under bad dust and dirt conditions.

It is believed that the nature and advantages of my invention will be clear from the foregoing description. Having thus described my invention, I claim:

1. An air cleaner of the character described comprising an outer cylindrical shell, an inner tube therein, a helical sheet member connecting the shell and tube, partition means extending outwardly from the tube and forming with the tube a small chamber between convolutions of the sheet, the tube having a slot opening into the chamber, a louvered cover forming the outer wall of the chamber, said cover being positioned in spaced relation to the shell to provide a space between the cover and the shell the space between the shell and tube being open to atmosphere at one end of the shell, and an air outlet from said space at the other end of the shell, whereby air drawn off at said outlet must pass outwardly of the chamber within the shell in a helical path, the shell having a slot therein opening into the space between the shell and cover adjacent to the downstream end of the cover, and a skimming lip at the downstream edge of the slot operable to direct an outer layer of air through said slot in the shell.

2. An air cleaner of the character described comprising an outer cylindrical shell, an inner tube therein, a helical sheet member connecting the shell and tube, partition means extending outwardly from the tube and forming with the tube a small chamber between convolutions of the sheet, the tube having a slot opening into the chamber, a louvered cover forming the outer wall of the chamber, said cover being positioned in spaced relation to the shell to provide a space between the cover and the shell the space between the shell and tube being open to atmosphere at one end of the shell, and an air outlet from said space at the other end of the shell, whereby air drawn off at said outlet must pass outwardly of the chamber within the shell in a helical path, the shell having a slot therein opening into the space between the shell and cover adjacent to the downstream end of the cover and through which air and dust at the inner shell surface is passed to the exterior of the shell.

3. An air cleaner of the character described comprising an outer cylindrical shell, an inner tube therein, a helical sheet member connecting the shell and tube, partition means extending outwardly from the tube and forming with the tube a small chamber between convolutions of the sheet, the tube having a slot opening into the chamber, a louvered cover forming the outer wall of the chamber, said cover being positioned in spaced relation to the shell to provide a space between the cover and the shell the space between the shell and tube being open to atmosphere at one end of the shell, and an air outlet from said space at the other end of the shell, whereby air drawn off at said outlet must pass outwardly of the chamber within the shell in a helical path, the shell having a slot therein opening into the space between the shell and cover adjacent to the downstream end of the cover and through which air and dust at the inner shell surface is passed to the exterior of the shell, a hood outside the shell covering the slot in the shell and means to draw air out of the space between the hood and the shell.

4. An air cleaner of the character described comprising an outer cylindrical shell, an inner tube therein, a helical sheet member connecting the shell and tube, partition means extending outwardly from the tube and forming with the tube a small chamber between convolutions of the sheet, the tube having a slot opening into the chamber, a louvered cover forming the outer wall of the chamber, said cover being positioned in spaced relation to the shell to provide a space between the cover and the shell the space between the shell and tube being open to atmosphere at one end of the shell, and an air outlet from said space at the other end of the shell, whereby air drawn off at said outlet must pass outwardly of the chamber within the shell in a helical path, the shell having a slot therein opening into the space between the shell and cover adjacent to the downstream end of the cover and through which air and dust at the inner shell surface is passed to the exterior of the shell, and means to vary the opening of the slot.

5. An air cleaner of the character described comprising an outer cylindrical shell, an inner tube therein, a helical sheet member connecting the shell and tube, partition means extending outwardly from the tube and forming with the tube a small chamber between convolutions of the sheet, the tube having a slot opening into the chamber, a louvered cover forming the outer wall of the chamber, said cover being positioned in spaced relation to the shell to provide a space between the cover and the shell the space between the shell and tube being open to atmosphere at one end of the shell, and an air outlet from said space at the other end of the shell, whereby air drawn off at said outlet must pass outwardly of the chamber within the shell in a helical path, the shell having a slot therein opening into the space between the shell and cover adjacent to the downstream end of the cover, and a skimming lip at the downstream edge of the slot operable to direct an outer layer of air through said slot in the shell, the shell having means mounted thereon for moving the skimming lip to vary the amount of air flow through the slot in the shell.

6. An air cleaner of the character described comprising an outer cylindrical shell, an inner tube therein, a helical sheet member connecting the shell and tube, partition means extending outwardly from the tube and forming with the tube a small chamber between convolutions of the sheet, the tube having a slot opening into the chamber, a louvered cover forming the outer wall of the chamber, said cover being positioned in spaced relation to the shell to provide a space between the cover and the shell the space between the shell and tube being open to atmosphere at one end of the shell, and an air outlet from said space at the other end of the shell, whereby air drawn off at said outlet must pass outwardly of the chamber within the shell in a helical path, the shell having a slot therein opening into the space between the shell and cover adjacent to the downstream end of the cover and through which air and dust at the inner shell surface is passed to the exterior of the shell, and means outside the shell to draw air away from the slot in the shell.

References Cited in the file of this patent

UNITED STATES PATENTS

| | | |
|---|---|---|
| 1,411,606 | Brereton | Apr. 4, 1922 |
| 1,496,908 | Schutz | June 10, 1924 |
| 1,501,144 | Stone | July 15, 1924 |
| 1,530,645 | Brockway | Mar. 24, 1925 |
| 1,743,171 | Wagner | Jan. 14, 1930 |